United States Patent
Vosahlik et al.

(10) Patent No.: US 12,497,041 B2
(45) Date of Patent: Dec. 16, 2025

(54) DRIVER AND LEAD VEHICLE PREDICTION MODEL

(71) Applicant: Garrett Transportation I Inc., Torrance, CA (US)

(72) Inventors: David Vosahlik, Prague (CZ); Matej Pcolka, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 416 days.

(21) Appl. No.: 17/969,398

(22) Filed: Oct. 19, 2022

(65) Prior Publication Data

US 2024/0132066 A1   Apr. 25, 2024
US 2024/0227796 A9   Jul. 11, 2024

(51) Int. Cl.
*B60W 30/14*     (2006.01)
*B60W 40/105*    (2012.01)
*B60W 50/00*     (2006.01)

(52) U.S. Cl.
CPC ........ *B60W 30/143* (2013.01); *B60W 40/105* (2013.01); *B60W 50/0097* (2013.01); *B60W 2554/4042* (2020.02); *B60W 2555/60* (2020.02)

(58) Field of Classification Search
None
See application file for complete search history.

(56) References Cited

U.S. PATENT DOCUMENTS

| | | |
|---|---|---|
| 8,788,134 B1 | 7/2014 | Litkouhi et al. |
| 8,948,995 B2 | 2/2015 | Pandita et al. |
| 8,972,145 B2 | 3/2015 | Mahler et al. |
| 9,511,769 B2 | 12/2016 | Fairgrieve et al. |
| 9,697,729 B2 | 7/2017 | Vahidi et al. |
| 10,239,529 B2 | 3/2019 | Filev et al. |
| 10,388,168 B2 | 8/2019 | Deragarden |
| 10,493,988 B2 | 12/2019 | Liu et al. |
| 10,497,261 B2 | 12/2019 | Kim et al. |
| 10,737,695 B2 | 8/2020 | Liu et al. |

(Continued)

FOREIGN PATENT DOCUMENTS

| | | |
|---|---|---|
| DE | 102008019174 A1 | 10/2009 |
| DE | 102019205020 A1 * | 10/2020 |

(Continued)

OTHER PUBLICATIONS

Extended European Search Report for EP Application No. 23196312.5 issued Mar. 11, 2024, 9 pages.

(Continued)

*Primary Examiner* — Madison R. Inserra
(74) *Attorney, Agent, or Firm* — BelayIP

(57) ABSTRACT

Methods and systems for predicting velocities of both a lead vehicle and an ego vehicle along a travel route. The ego vehicle generates a velocity profile for the ego vehicle and a velocity prediction for the lead vehicle, and uses the ego vehicle velocity profile and the lead vehicle velocity prediction to estimate position and velocity of the ego vehicle in the travel route. Preview information from a navigation system is used and may include velocity limitations for the travel route derived from the travel route characteristics. Driver actions are used when generating the ego vehicle velocity profile by calculating a virtual velocity setpoint for the ego vehicle.

17 Claims, 5 Drawing Sheets

(56) References Cited

U.S. PATENT DOCUMENTS

| | | |
|---|---|---|
| 10,843,690 B2 | 11/2020 | Shalev-Shwartz et al. |
| 2006/0167784 A1 | 7/2006 | Hoffberg |
| 2007/0087756 A1 | 4/2007 | Hoffberg |
| 2008/0215512 A1 | 9/2008 | Narzisi et al. |
| 2010/0036578 A1 | 2/2010 | Taguchi et al. |
| 2010/0235285 A1 | 9/2010 | Hoffberg |
| 2013/0176146 A1 | 7/2013 | Dusparic et al. |
| 2014/0309814 A1 | 10/2014 | Ricci et al. |
| 2014/0309815 A1 | 10/2014 | Ricci et al. |
| 2014/0309839 A1 | 10/2014 | Ricci et al. |
| 2014/0309864 A1 | 10/2014 | Ricci |
| 2014/0309913 A1 | 10/2014 | Ricci et al. |
| 2014/0309929 A1 | 10/2014 | Ricci |
| 2014/0309934 A1 | 10/2014 | Ricci |
| 2015/0006035 A1 | 1/2015 | Ricci |
| 2015/0111591 A1 | 4/2015 | Hoffberg |
| 2016/0129908 A1 | 5/2016 | Harda |
| 2016/0155326 A1 | 6/2016 | Ricci et al. |
| 2016/0224951 A1 | 8/2016 | Hoffberg |
| 2017/0067747 A1 | 3/2017 | Ricci |
| 2017/0355368 A1 | 12/2017 | O'Dea et al. |
| 2018/0001764 A1 | 1/2018 | Bang |
| 2018/0068358 A1 | 3/2018 | Hoffberg |
| 2019/0096238 A1 | 3/2019 | Chen et al. |
| 2019/0244521 A1 | 8/2019 | Chen et al. |
| 2019/0287396 A1 | 9/2019 | Sayin et al. |
| 2019/0367032 A1 | 12/2019 | Ito et al. |
| 2020/0021961 A1 | 1/2020 | Chen et al. |
| 2020/0168081 A1 | 5/2020 | Chen et al. |
| 2020/0284883 A1 | 9/2020 | Ferreira et al. |
| 2020/0290629 A1 | 9/2020 | Mine et al. |
| 2020/0298859 A1 | 9/2020 | Ozay et al. |
| 2020/0307589 A1 | 10/2020 | Li et al. |
| 2021/0009128 A1* | 1/2021 | Jokela ............... B60W 50/0097 |
| 2021/0018243 A1 | 1/2021 | Zhang et al. |
| 2021/0035378 A1 | 2/2021 | Lekutai |
| 2021/0061278 A1 | 3/2021 | Zhao et al. |
| 2021/0109535 A1 | 4/2021 | Tansey |
| 2021/0118294 A1 | 4/2021 | Chen et al. |
| 2021/0179143 A1 | 6/2021 | Shin et al. |
| 2021/0183243 A1 | 6/2021 | Mobasser |
| 2021/0188319 A1 | 6/2021 | Xu et al. |
| 2021/0197852 A1 | 7/2021 | Fairfield et al. |
| 2021/0200231 A1 | 7/2021 | Zhu |
| 2021/0200238 A1 | 7/2021 | Galoogahi et al. |
| 2021/0211568 A1 | 7/2021 | Zhou et al. |
| 2021/0213932 A1 | 7/2021 | Aggoune et al. |
| 2021/0233392 A1 | 7/2021 | Mcconnell |
| 2021/0233396 A1 | 7/2021 | Guo et al. |
| 2021/0237769 A1 | 8/2021 | Ostafew |
| 2021/0240148 A1 | 8/2021 | Cheriton |
| 2021/0240197 A1 | 8/2021 | Shalev-Shwartz et al. |
| 2021/0241610 A1 | 8/2021 | Matesevac, III et al. |
| 2021/0241624 A1 | 8/2021 | Kan et al. |
| 2022/0024461 A1 | 1/2022 | Takei et al. |

FOREIGN PATENT DOCUMENTS

| | | |
|---|---|---|
| EP | 3579211 A1 | 12/2019 |
| EP | 3774474 B1 | 2/2022 |
| KR | 101672133 B1 | 11/2016 |
| WO | 20190136694 A1 | 1/2019 |
| WO | 2021078392 A1 | 4/2021 |
| WO | 2021089150 A1 | 5/2021 |
| WO | WO-2024022141 A1 * | 2/2024 |

OTHER PUBLICATIONS

Eliot, "The Truth is that Traffic Lights Won't be Shelved Due to Self-Driving Cars," Forbes.com, 8 pages, Mar. 20, 2021, Accessed Aug. 11, 2021.

Heavin, "No More Red Lights? Proposed System for Self-Driving Cars Eliminates Need to Stop," University of Missouri College of Engineering, 17 pages, Mar. 15, 2021. Accessed Aug. 11, 2021.

Li et al; "An Improved Traffic Lights Recognition Algorithm for Autonomous Driving in Complex Scenarios," Journals Sage Publications.com, 33 pages, May 24, 2021, Accessed Aug. 11, 2021.

Moser et al; "Cooperative Adaptive Cruise Control Applying Stochastic Linear Model Predictive Control Strategies," Conference Paper, 7 pages, Jul. 2015.

Robert, "Linking Self-Driving Cars to Traffic Signals Might Help Pedestrians Give them the Green Light," School of Information, University of Michigan, 6 pages, Apr. 21, 2020. Viewed Aug. 1, 2021.

Sama Inc., "The Traffic Light Problem for Autonomous Vehicles," 7 pages, Apr. 23, 2020. Accessed Aug. 11, 2021.

Seredynski et al; "Comparison of Green Light Optimal Speed Advisory Approaches," Conference Paper, 7 pages, Oct. 2013.

* cited by examiner

DRIVER AND LEAD VEHICLE PREDICTION MODEL

BACKGROUND

Optimization of vehicle behavior is useful to reduce fuel consumption, extend vehicle and/or component life, and/or minimize emissions. Complex analyses may take place to determine velocities that the vehicle should use to optimize any of these factors. For example, the power split for a hybrid electric vehicle may be determined using preview information related to upcoming vehicle torque demands to optimize fuel consumption. One factor which has not often been well considered is the granular effect of surrounding vehicles, particularly lead vehicles in the same driving path as the ego vehicle. Lead vehicle behavior may, for example, limit the maximum speed that an ego vehicle can achieve without violating safe following distance. Some examples suggest obtaining data from the lead vehicle itself to model lead vehicle behavior (for example, as disclosed in WO2021089150). Another factor which is not often handled rigorously is ego vehicle driver behavior.

New and alternative methods that better model and account for a lead vehicle and driver behavior are desired.

OVERVIEW

The present inventors have recognized, among other things, that a problem to be solved is the need for new and/or alternative strategies for predicting lead vehicle behavior and/or ego vehicle driver behavior. Such predictions can be further used in the optimization of ego vehicle control operations, such as in engine control, hybrid split control, etc.

A first illustrative, non-limiting example takes the form of an ego vehicle comprising a powertrain, a navigation system, and a controller coupled to each of the powertrain and navigation system, the controller configured to: obtain preview information from the navigation system including velocity limit data related to a route on which the vehicle is travelling, and lead vehicle data related to a lead vehicle that is also on the route; generate, for the lead vehicle, a lead vehicle velocity prediction; generate, for the ego vehicle, an ego vehicle velocity profile; and estimate an ego vehicle velocity prediction.

Additionally or alternatively, the controller is configured to generate the lead vehicle velocity prediction by: initializing a lead vehicle velocity setpoint using a measured velocity of the lead vehicle; calculating lead vehicle velocity limits using the preview information, and determining the lead vehicle velocity prediction using the lead vehicle velocity setpoint and lead vehicle velocity limits by predicting that the lead vehicle will accelerate to the lead vehicle velocity limits.

Additionally or alternatively, the controller is configured to adjust the lead vehicle velocity setpoint up and down as follows: if the lead vehicle is not accelerating: if the lead vehicle is travelling above the lead vehicle velocity setpoint, the lead vehicle velocity setpoint is adjusted upward; if the lead vehicle is travelling above a minimum velocity and is travelling below the lead vehicle velocity limits less a margin, the lead vehicle velocity setpoint is adjusted downward; and if the lead vehicle is accelerating, and the lead vehicle is travelling above the lead vehicle velocity setpoint, the lead vehicle velocity setpoint is adjusted upward.

Additionally or alternatively, the controller is configured to generate a lead vehicle velocity profile as a function of lead vehicle position on the route, and convert the lead vehicle velocity profile into the lead vehicle velocity prediction as a function of time. Additionally or alternatively, the controller is configured to generate the lead vehicle velocity prediction without attempting to account for a further lead vehicle in front of the lead vehicle. Additionally or alternatively, the controller is configured to use the lead vehicle velocity prediction to limit the ego vehicle velocity prediction if the ego vehicle would, within the prediction window, come within a distance threshold of the lead vehicle.

Additionally or alternatively, the controller is configured to generate the ego vehicle velocity profile by: either initializing an ego velocity setpoint, or adjusting a stored ego vehicle velocity setpoint up and down in response to actions of a driver; calculating ego vehicle velocity limits as a function of location on the route using the preview information without considering the lead vehicle; and using a minimum of the ego vehicle velocity setpoint or the ego vehicle velocity limits as the ego vehicle velocity profile for locations along the route. Additionally or alternatively, the ego vehicle velocity limits include at least one of: a velocity limit calculated using road curvature; and a velocity limit based on prevailing traffic speeds.

Additionally or alternatively, the controller is configured to adjust the ego vehicle velocity setpoint up and down as follows: if the ego vehicle is not accelerating: if the ego vehicle is travelling above the ego vehicle velocity setpoint, the ego vehicle velocity setpoint is adjusted upward; if the ego vehicle is travelling above a minimum velocity and is travelling below the ego vehicle velocity limits less a margin, without a lead vehicle present, the ego vehicle velocity setpoint is adjusted downward; and if the ego vehicle is accelerating, and the ego vehicle is travelling above the ego vehicle velocity setpoint, the ego vehicle velocity setpoint is adjusted upward.

Additionally or alternatively, the powertrain is a hybrid powertrain including a first power source and a second power source, wherein the controller is configured to use the ego vehicle velocity prediction to calculate a torque split for the hybrid powertrain. Additionally or alternatively, the controller is configured to estimate, for the ego vehicle, an acceleration prediction and a position prediction, each as a function of time, along with the ego vehicle velocity prediction. Additionally or alternatively, the controller is configured to estimate, for the lead vehicle, an acceleration prediction and a position prediction, each as a function of time, along with the lead vehicle velocity prediction.

Additionally or alternatively, the controller comprises: a velocity profile generator configured to generate the ego vehicle velocity profile; a lead vehicle prediction module configured to generate the lead vehicle velocity prediction; and a vehicle cruise controller configured to receive the ego vehicle velocity profile and the lead vehicle velocity prediction, and estimate the ego vehicle velocity prediction.

Additional examples may take the form of a controller as in any of the preceding examples, provided separately from an ego vehicle.

Another illustrative and non-limiting example takes the form of a method of operation in an ego vehicle having a powertrain, a navigation system, and a controller, the method comprising: the controller obtaining preview information from the navigation system including velocity limit data related to a route on which the vehicle is travelling, and lead vehicle data related to a lead vehicle that is also on the route; the controller generating, for the lead vehicle, a lead vehicle velocity prediction; the controller generating, for the ego vehicle, an ego vehicle velocity profile; and the controller estimating an ego vehicle velocity prediction using the lead vehicle velocity prediction and the ego vehicle velocity profile.

Additionally or alternatively, the step of generating the lead vehicle velocity prediction is performed by: initializing a lead vehicle velocity setpoint using a measured velocity of the lead vehicle; calculating lead vehicle velocity limits using the preview information, and determining the lead vehicle velocity prediction using the lead vehicle velocity setpoint and lead vehicle velocity limits by predicting that the lead vehicle will accelerate to the lead vehicle velocity limits.

Additionally or alternatively, the method may also comprise adjusting the lead vehicle velocity setpoint up and down as follows: if the 10 lead vehicle is not accelerating: if the lead vehicle is travelling above the lead vehicle velocity setpoint, the lead vehicle velocity setpoint is adjusted upward; if the lead vehicle is travelling above a minimum velocity and is travelling below the lead vehicle velocity limits less a margin, the lead vehicle velocity setpoint is adjusted downward; and if the lead vehicle is accelerating, and the lead vehicle is travelling above the lead vehicle velocity 15 setpoint, the lead vehicle velocity setpoint is adjusted upward.

Additionally or alternatively, the step of generating the lead vehicle velocity prediction comprises: generating a lead vehicle velocity profile as a function of lead vehicle position on the route, and converting the lead vehicle velocity profile into the lead vehicle velocity prediction as a function of time, without attempting to account for a further lead vehicle in front of the lead vehicle. Additionally or alternatively, the step of estimating the ego vehicle velocity prediction includes using the lead vehicle velocity prediction to limit the ego vehicle velocity prediction if the ego vehicle would, within the prediction window, come within a distance threshold of the lead vehicle. Additionally or alternatively, the preview information comprises at least one of traffic light or stop sign data, and the step of estimating the ego vehicle velocity prediction includes using the at least one of traffic light or stop sign data to limit the ego vehicle velocity prediction.

Additionally or alternatively, the step of generating the ego vehicle velocity profile includes: either initializing an ego velocity setpoint, or adjusting a stored ego vehicle velocity setpoint up and down in response to driver actions; calculating ego vehicle velocity limits as a function of location on the route using preview information without considering the lead vehicle; and using a minimum of the ego vehicle velocity setpoint or the ego vehicle velocity limits as the ego vehicle velocity profile for locations along the route.

Additionally or alternatively, the method may further comprise adjusting the ego vehicle velocity setpoint up and down as follows: if the ego vehicle is not accelerating: if the ego vehicle is travelling above the ego vehicle velocity setpoint, the ego vehicle velocity setpoint is adjusted upward; if the ego vehicle is travelling above a minimum velocity and is travelling below the ego vehicle velocity limits less a margin, without a lead vehicle present, the ego vehicle velocity setpoint is adjusted downward; and if the ego vehicle is accelerating, and the ego vehicle is travelling above the ego vehicle velocity setpoint, the ego vehicle velocity setpoint is adjusted upward.

Still further examples may take the form of a configurable controller coupled to a memory, the memory and/or controller being configured to perform any of the preceding methods. In some such examples, the memory and/or controller may be provided as part of a vehicle. Additional examples take the form of a tangible and/or non-transitory memory storing instructions for a controller, the instructions being executable by the controller to perform any of the preceding methods.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Some examples herein predict ego vehicle driver behavior and/or lead vehicle behavior. As used herein, an "ego" vehicle is the vehicle in which analysis is taking place, and a "lead" vehicle is another vehicle travelling on the same route and in the same direction as the ego vehicle, in front of the ego vehicle. Without limiting the use of such predictions, an example may rely on predicted behavior to determine inputs to modern predictive control approaches such as Model Predictive control (MPC). The MPC requires a preview information to be available for prediction horizon, and then uses iterative solvers to determine a least cost solution in the prediction horizon. An example use case can be predictive power split for the hybrid electric vehicle where the task is to minimize fuel consumption by satisfying the predicted vehicle torque demand by splitting between torque supplied by a motor generating unit (MGU) coupled to a rechargeable battery (the "hybrid" power source), and a fuel consuming power source such as an internal combustion engine. For such examples, the MPC controller requires the predictions of the ego vehicle torque demands which depend, in some examples, at least partly on driver and lead vehicle behavior. The driver and lead vehicle predictions are calculated using preview information about the road the ego vehicle travels upon. The road preview information may contain, but is not limited to, road grade profile, curvature, posted speed limits, and/or advisories, traffic lights, stop signs, etc., as well as other factors discussed below.

Figure 1:
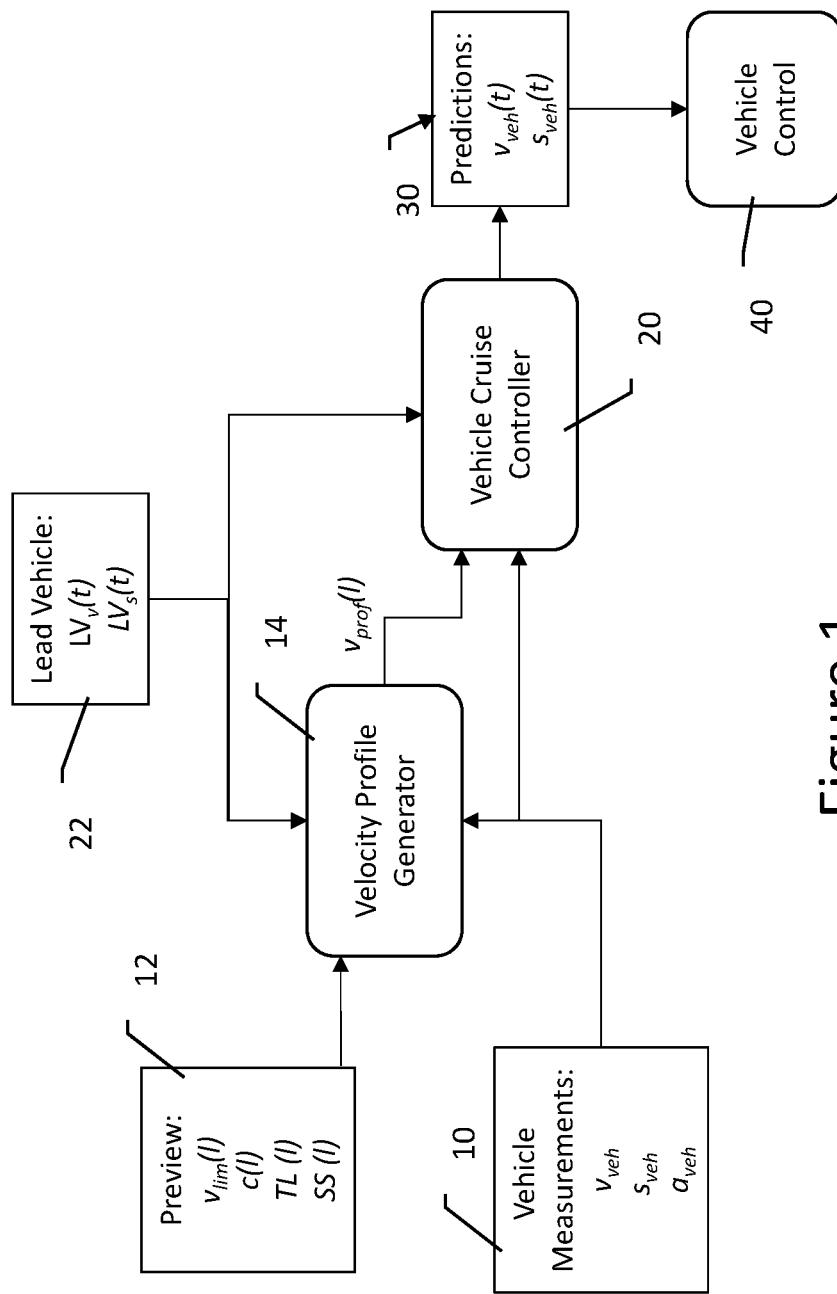
FIG. 1 shows a process flow for implementation of an ego vehicle predictor in a vehicle controller.

Implementation of driver and lead vehicle prediction models is done following a model-based approach. Both the driver prediction model and lead vehicle prediction model include two main building blocks: a velocity profile generator, and a vehicle cruise controller model. In examples, the prediction model is derived as discrete-time model, which is beneficial for implementation in a computer and fits MPC structure (discrete-time algorithm). An illustrative architecture of the prediction model is shown in FIG. 1.

A set of instantaneous measurements 10 are used, including ego vehicle velocity, $v_{veh}$, ego vehicle distance, $s_{veh}$, and ego vehicle acceleration $a_{veh}$. A set of road previews 12 are used, referencing l, the distance variable along the expected route, including curvature preview c(l), speed limits $v_{lim}$(l), and traffic control inputs which, in the example shown, include traffic lights preview, TL(l), and stop sign preview, SS(l). The traffic lights preview may include traffic light distance and forbidden (red light) time ranges, and may be updated in real time using, for example, communications with road infrastructure where available. The road curvature preview c(l) indicates road curvature within the upcoming roadway. In some models, the road curvature allows consideration of comfort or safety limits on the vehicle velocity in which lateral forces acting on the vehicle are to be limited.

The vehicle measurements 10 and road preview 12 are provided to a velocity profile generator 14, which outputs a velocity profile, $v_{prof}$(l), as a function of the distance variable. The vehicle cruise controller predictor 20 receives the velocity profile from the velocity profile generator 14, the vehicle measurements 10, and lead vehicle preview and measurements 22, and outputs predictions of vehicle velocity $v_{veh}$(t) and vehicle distance $s_{veh}$(t), with the predictions 30 output as functions of time. That is, the predictions 30 indicate the vehicle position on the travel route and the velocity of the vehicle at each time instance. The predictions 30 may also include predicted acceleration of the vehicle, $a_{veh}$(t).

As can be seen, the velocity profile generator 14 is used to create a velocity profile, which may be treated as an ego vehicle velocity profile reference, that the vehicle cruise controller predictor 20 can then track. Within the velocity profile generator 14, the velocity profile is created starting with an assumption that the driver will follow a constant "virtual" velocity setpoint $v_{sp}$ unless an external disturbance or influence causes a change in the vehicle velocity. The virtual velocity setpoint may change in response to changes in speed limit, lead vehicle presence, road curvature, traffic signal, driver actions, etc. This setpoint has to be estimated for the ego vehicle, since the actual driver's behavior is not yet known. The virtual velocity setpoint can be estimated using a filter as shown in Equation 1:

$$v_{sp}(t)=\lambda v_{sp}(t-1)+(1-\lambda)v_{update} \quad \{Eq. 1\}$$

Where $\lambda$ is a filter constant, $v_{update}$ is the new value of the setpoint to be followed, and t is the discrete time variable. Filtering the update is done to reduce the impact of measurement noises and/or possibly erroneous $v_{update}$ values caused by such noises. The filter constant $\lambda$ may be a design parameter set in the range of about 0.8 to about 0.99. In one example, $\lambda$ is set to 0.95. The update to $v_{sp}$ may be evaluated against any design constraints before the actual velocity profile generation takes place.

Updating the virtual velocity setpoint can occur using $v_{update}$ as determined by one of the following:

Case 1: $v_{update}=v_{veh}(t)$, where $v_{veh}(t)$ is the vehicle velocity at time t, under the condition that the vehicle is not accelerating or decelerating.

Case 2: $v_{update}=v_{lim}(s_{veh}(t))$, where $v_{lim}(s_{veh}(t))$ is a velocity limit at the current vehicle distance/position $s_{veh}(t)$, under the conditions that $v_{veh}(t)>v_{sp}(t)$, and $a_{veh}(t)>0$, meaning that the vehicle is accelerating and has a higher velocity than the virtual velocity setpoint.

If neither of case 1 or case 2 applies, then $v_{update}=v_{sp}(t-1)$, and therefore $v_{sp}(t)=v_{sp}(t-1)$.

Regarding case 1, no vehicle acceleration or deceleration is occurring, and the value of the virtual setpoint update $v_{update}$ can then be set equal to the current vehicle velocity. Equation 1 is updated to Equation 2:

$$v_{sp}(t)=\lambda v_{sp}(t-1)+(1-\lambda)v_{veh}(t) \quad \{Eq. 2\}$$

The conditions for case 1 may be, but are not necessarily limited to, the following:

$|a_{veh}(t)|<\in_{\Delta v}$ Here, the vehicle acceleration is nearly zero, and a threshold limit, $\in_{\Delta v}$ accounts for the measurement noise.

$v_{veh}(t)>v_{updmin}$ Here, the vehicle velocity is higher than a threshold, $v_{updmin}$, which is design parameter. A threshold value for $v_{updmin}$ may be, for example, 3 m/s (10.8 km/hr), with a range for example of about 5 to about 15 km/hr, or more or less.

In combination with both of the above, either of:

$v_{veh}(t)+\in_{v_{lim}}<v_{lim}(s_{veh}(t))$, and no lead vehicle is detected. Here, the vehicle velocity is below velocity limits at least by an $\in_{v_{lim}}$ threshold, and no lead vehicle is present. As noted previously, $s_{veh}(t)$ is the vehicle position along the route at time t. The threshold, $\in_{v_{lim}}$ is design parameter with typical value of about 2 m/s, and may be in the range of about 1 to about 3 m/s, or more or less; or $v_{veh}(t)>v_{sp}(t)$; that is, the vehicle velocity is higher than the virtual setpoint $v_{sp}(t)$ value.

If all the conditions listed are satisfied simultaneously then $v_{update}=v_{veh}(t)$ and the virtual setpoint would be shifted towards the $v_{veh}(t)$ velocity. At a higher level, this updating of the virtual velocity setpoint can be understood as occurring with the vehicle at more or less steady velocity, above some minimum velocity, and meeting one of two conditions: the vehicle is travelling below applicable velocity limits by at least some minimum amount with no lead vehicle present, or the vehicle is travelling above the virtual velocity setpoint. Under these conditions, the virtual update uses the current vehicle velocity in one of two circumstances. First, if the driver is, for whatever reason, not driving the vehicle at a maximum allowable speed without a lead vehicle present, the virtual velocity setpoint is adjusted to match the speed the driver has selected. The maximum allowable speed may be a posted speed limit, for example, may be a limit estimated using road curvature, or may be a constraint of the vehicle itself (such as a governor limitation). Second, if the driver is driving at a consistent speed above the virtual velocity setpoint, the virtual velocity setpoint is increased. This latter circumstance may include allowing the virtual setpoint to exceed the posted speed limit, allowing the analysis to provide accurate predictions of the driver's actual behavior to other system componentry, for example, when the driver exceeds legal speed limits.

Turning next to case 2, the update will take place in response to the vehicle accelerating while the virtual velocity setpoint is below current vehicle speed. A higher setpoint is called for, as the virtual velocity setpoint is not reflecting the driver's current choices. The analysis then calls for updating the virtual velocity setpoint toward its maximum value, which would be $v_{sp}(t)$, by updating Equation 1 as shown in Equation 3:

$$v_{sp}(t)=\lambda v_{sp}(t-1)+(1-\lambda)v_{lim}(s_{veh}(t)) \quad \{Eq. 3\}$$

The conditions needed for this update may be summarized as:

First, $v_{veh}(t)>v_{sp}(t)$, which means that the current vehicle velocity is above the current virtual velocity setpoint.

Second, $a_{veh}(t)>0$, meaning the vehicle is accelerating.

If desired, the second condition may be modified to use $a_{veh}(t)\geq 0$ or $a_{veh}(t)>\in_{\Delta V}$.

If the conditions for case 1 and case 2 are not met, then no update is needed and Equation 1 becomes simply:

$$v_{sp}(t)=v_{sp}(t-1) \qquad \{Eq.\ 4\}$$

Turning next to the velocity limits preview, $v_{lim}(l)$, as indicated by the use of the distance index, l, this preview may be determined on a distance basis. Use of the distance index is natural as the preview will come from a map which is itself defined in terms of distance/location. The assumption is that the vehicle can drive at these limits except when external conditions do not allow the vehicle to do so, such as the presence of a traffic and/or a lead vehicle, bad state of the road surface, weather conditions, and road curvature.

Road curvature can be used as a limitation, using c(l) as indicating curvature at distance index l, the velocity limitation, $v_{curva}(l)$ can be related to a maximum lateral acceleration threshold or limit, $a_{ymax}$, as shown in Equation 5:

$$v_{curva}(l) = \sqrt{\frac{a_{ymax}}{c(l)}} \qquad \{Eq.\ 5\}$$

The maximum lateral acceleration threshold may be a design parameter specific to a vehicle or driver; a typical value may be in the range of about 2-5 m/s². More sophisticated operations may be performed; for example, the maximum lateral acceleration limit may vary in response to weather or road conditions, if desired, thus making Equation 5 responsive to both road curvature and weather. Inputs for traffic, bad state of the road surface and weather conditions may be likewise calculated using navigation system data.

The minimum of each of the velocity limitations will serve as the updated velocity limit, as shown in Equation 6:

$$v_{updlim}=\min(v_{lim1},v_{lim2},\ldots v_{limi}) \qquad \{Eq.\ 6\}$$

Where $v_{lim1}, v_{lim2} \ldots v_{limi}$ each represent a different velocity limit input, including $v_{curva}(l)$ which may take the form shown in Equation 5. Other velocity limits may derive from traffic, road surface, weather, etc. In some examples, the posted or statutory speed limit may be used as one of the velocity limit inputs, however, since a driver is present, it may be suitable to allow the driver to determine posted speed limit compliance and only consider safety/comfort limitations imposed by the roadway along with prevailing traffic in the velocity limits of Equation 6. That is, for example, in some localities prevailing traffic may not conform to posted speed limits, such that predicting and/or optimizing behavior according to prevailing traffic speeds and driver choices may provide more usable outputs that can be used in various optimizations or other calculations. In some examples the posted speed limit can be omitted from the velocity input limits in Equation 6, noting that the calculation of the virtual velocity setpoint uses driver input, which contemplates the driver determining speed limit compliance, and when the velocity profile for the ego vehicle is constructed in Equation 9, below, the virtual velocity setpoint is one of the inputs.

Preview data from block 12 in FIG. 1 may include traffic related velocity limitations. Such limitations may include, for example and without limitation, measures or estimates of prevailing traffic speeds at locations along a route. Such data is available in real time from a number of navigation related sources. The traffic related velocity limitations may be included as one of the velocity limit inputs in Equation 6, if desired.

As illustrated in FIG. 1, the velocity profile is to be provided to the vehicle cruise controller predictor 20, which may be assumed to react only to the current situation, having no preview of its own. The limits preview applicable to the velocity profile generator may be updated to shift velocity limits to an earlier position relative to the roadway, creating a velocity profile that anticipates changes, allowing the vehicle cruise controller predictor 20 to model behavior before an actual velocity limit change takes place. This modification may be implemented as a shift (or plurality of shifts) of the $v_{updlim}$ as a function of distance. In some examples, the shift may also be a function of the velocity and time to reach the location in the road where a particular change will occur. An example would be a driver slowing before reaching a sharp curve. Shifting may be performed across the output value in Equation 6, or may be applied to each of the velocity input limits individually, as desired. Equation 7 shows how the shift can be applied to the output $v_{updlim}$ output:

$$v_{sft}^n(l)=v_{updlim}(l+n) \qquad \{Eq.\ 7\}$$

Where n stands for the number of distance samples the shift applies to. The final, processed velocity limits are then computed using a minimum of all the shifts:

$$v_{lim,proc}(l)=\min(v_{sft}^m,\min(v_{sft}^{m-1},\ldots \min(v_{sft}^1,v_{sft}^0))) \qquad \{Eq.\ 8\}$$

Where m is a design parameter corresponding to a desired shift difference, such as 50 meters. If desired, m may itself be a flexible input rated to the current vehicle velocity, or a velocity called for in the velocity profile at a particular location in the road, rather than a fixed value. That is, m may be larger at higher vehicle velocities, or smaller at lower vehicle velocities. For example, m may equal the product of a time interval (0.5 to 3 seconds for example) and current vehicle velocity, where the time interval is an estimate (or measurement, whether direct or inferred) of driver reaction time.

Figure 2:
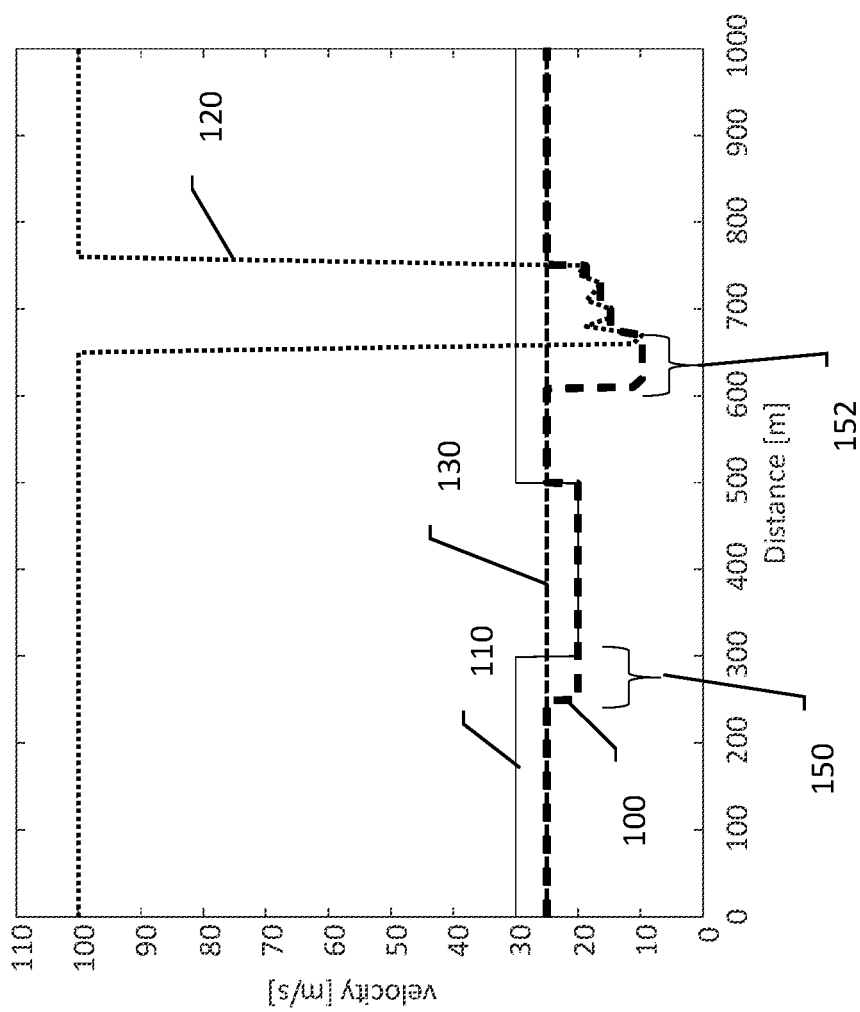
FIG. 2 is a graph showing velocity limitations.

The velocity profile can then be determined as follows shown in Equation 9:

$$v_{prof}(l)=\min(v_{sp},v_{lim,proc}(l)) \qquad \{Eq.\ 9\}$$

Where the system will generate a vector through the upcoming travel horizon comprising a plurality of discrete $v_{prof}(l_i)$ data points as shown in FIG. 2.

FIG. 2 shows the calculated velocity profile, $v_{prof}$, as the heavy broken line at 100, which is made up of a plurality of samples as a function of distance, each determined as a velocity in m/s. Line 110 represents a statutory speed limit, line 120 represents the curvature related safety/comfort limitation, $v_{curva}$, and line 130 is the virtual velocity setpoint, $v_{sp}$. The distance shift is represented at 150, showing how the reduction of the statutory speed limit 110 at about 300 meters affects the velocity profile 100 starting at about 250 meters, and again at 152, where the reduction of $v_{curva}$ 120 at about 650 meters affects the velocity profile starting at about 600 meters. Otherwise, the velocity profile 100 tracks the virtual velocity setpoint 130.

The velocity profile is provided to the vehicle cruise controller predictor 20, as indicated in FIG. 1. The vehicle cruise controller predictor 20 is a model based on one or more assumptions about driver or vehicle behavior. In the example, the vehicle cruise controller predictor 20 uses the velocity profile as the reference to be followed. In an example, an Intelligent Driver Model (IDM) is used, however, the cruise controller predictor 20 may use other models or technologies, such as a proportional-integral-derivative (PID) tracking reference.

As noted, the velocity profile is distance based coming out of the velocity profile generator 14. The vehicle cruise controller predictor 20, instead, operates using the time domain in the example shown. As a result, a domain transformation is performed using interpolation using a simulated vehicle distance, $s_{veh}(t)$ which is further discussed below, as shown in Equation 10:

$$v_{prof}(t) = \text{interp}(v_{prof}(l), s_{veh}(t)) \quad \{\text{Eq. 10}\}$$

The ego vehicle (the controlled vehicle) can be modeled as a double integrator in which:

$$\dot{s}_{veh} = v_{veh} \quad \{\text{Eq. 11}\}$$

$$\dot{v}_{veh} = a_{veh} \quad \{\text{Eq. 12}\}$$

Where $s_{veh}$ is the driven distance, $v_{veh}$ is the vehicle velocity, $a_{veh}$ is the system manipulated variable, and Equations 11 and 12 relate these variables to their changes. The IDM model is described in various literature covering vehicle and traffic simulations, and is described by Equations 13 and 14:

$$a_{veh} = a_{max}\left(1 - \left(\frac{v_{veh}(t_c)}{v_0(t_c)}\right)^4 - \left(\frac{s^*(t_c)}{\Delta s_{veh}(t_c)}\right)^2\right) \quad \{\text{Eq. 13}\}$$

$$s^* = s_0 + v_{veh}(t_c)T + \frac{v_{veh}(t_c)\Delta v_{veh}(t_c)}{2\sqrt{(a_{max}b)}} \quad \{\text{Eq. 14}\}$$

where $t_c$ is continuous time variable, $\Delta s_{veh}(t_c)$ is the distance between the lead vehicle (LV) and the ego vehicle, and $\Delta v_{veh}(t_c)$ is the lead vehicle relative velocity. Further, $v_0(t_c)$ is the velocity that the ego vehicle would drive in free traffic, which equals the velocity profile to be followed as $v_0(t_c) = v_{prof}(t_c)$, and is received from the profile generator as interpolated using Equation 10. Further variables are $s_0$, the minimum desired spacing between the ego vehicle and the lead vehicle, T, the minimum time to the lead vehicle minimum spacing, $a_{max}$, the maximum acceleration/deceleration of the ego vehicle, and b is the comfortable braking deceleration.

The IDM can be simulated iteratively in a feedback loop using the double integrator model to obtain the time behavior prediction of the controlled vehicle. Discretization of the above can be performed using a Euler discretization scheme as in Equations 15-16:

$$s_{veh}(t+1) = s_{veh}(t) + T_s v_{veh}(t) \quad \{\text{Eq. 15}\}$$

$$v_{veh}(t+1) = v_{veh}(t) + T_s a_{veh}(t) \quad \{\text{Eq. 16}\}$$

Where t is the discrete time index, and $T_s$ is the output sampling time. With each iteration, the system manipulated variable, acceleration $a_{veh}(t)$, is computed from the actual velocity $v_{veh}(t)$ and distance $s_{veh}(t)$. The velocity setpoint $v_0(t)$ is derived from the distance $s_{veh}(t)$ of the model.

Discretization can be modified to ensure compliance with the Euler discretization assumption (that is, sampling time $T_s$ is to be much less than the quickest time constant in the underlying models), and so a second sampling time $T_{sq}$ may be introduced and selected where $T_s$ is an integer multiple of $T_{sq}$ so that the Euler assumption is met. If this modification is performed, then the model may be simulated using $T_{sq}$, and only every $T_s/T_{sq}$ sample is stored in the preview when output.

The prediction model may further include stop signs and traffic lights in the calculations. The prediction horizon can be first divided into parts between the particular stop signs and/or traffic lights. For the distance between the stop signs/traffic lights, the above handling suffices. When approaching/reaching a stop sign, for example, 100 meters before reaching a stop sign or signal (or more or less, and possibly modified to account for speed or weather/road conditions, with longer distance for higher speeds), the velocity profile decreases with constant deceleration (in the time domain) to zero speed at a selected location near the sign (anywhere from 0 to 10 meters, for example, before the sign, for example). A stopping time can then be added to the model, such as anywhere from 0.5 to 5 seconds, for example, 3 seconds. After the stopping time ends, a new prediction region is calculated.

For traffic lights, as the vehicle approaches a traffic light, a calculation may be performed to determine whether the vehicle will reach the traffic signal during a forbidden interval (red light), such as by communication with infrastructure to obtain traffic light pattern or state. If the traffic light will not be reached during the forbidden interval, the vehicle proceeds as if the light is not present. If the traffic light is to be reached during the forbidden interval, the prediction model assumes deceleration starting from a chosen distance, such as 100 meters (or more or less, and possibly modified to account for speed or weather/road conditions, with longer distance for higher speeds), the velocity profile decreases with constant deceleration (in the time domain) to zero speed at a selected location. Waiting time in this example is not fixed, and will depend on traffic light state. If the traffic light is observed to be in the forbidden interval, but has not been reached, the approach may assume deceleration, as the driver's behavior is being modeled, and the driver can be assumed to not know when the light will again turn green. When the light turns green, whether the ego vehicle is stopped or decelerating in anticipation of stopping, the normal mode described previously is applied to model upcoming acceleration With the stop signs, the inclusion of a velocity limit term is relatively easy as a function of distance to the stop sign; the velocity limit can be set to "High" (that is, the highest allowable value, for example), until a distance ahead of the stop sign is reached, and the velocity limit can be set according to constant deceleration, as desired. A relative velocity limit may be used instead, where the stop sign velocity limit term is "High" until a comfortable stopping distance in front of the sign is reached, then a constant deceleration is assumed to calculate the velocity limit.

With traffic lights, the velocity limitation term for inclusion in Equation 6 may again be set as "High" unless a traffic light is in the prediction horizon and data is known regarding the light or a likely driver reaction. In an example, at relatively larger distances from the traffic light, data from infrastructure may be used to determine whether the traffic light is likely to require driver action. As the ego vehicle approaches the traffic light, driver actions may be used instead. For example, the system may calculate a traffic-light related velocity limitation by observing driver actions at a particular distance from the traffic light, such as, if the driver depresses the brake at a location in advance of the traffic light, the system may then presume deceleration to a stop is going to take place, and models a stop in the upcoming roadway. If, instead, the driver depresses the accelerator at a particular distance from the traffic light, it may be assumed that the vehicle will not be stopping. Thus external data obtained from infrastructure may be used, or internal data obtained by observing driver actions may be used.

As noted, the PID tracking reference may be used instead in the vehicle cruise controller. Here, the cruise controller would calculate a predicted velocity for the vehicle by observing a current velocity, and assuming control signals to accelerate or decelerate the vehicle so that the velocity profile is tracked, with the lead vehicle influence used to cap velocity upon reaching a following distance from the lead vehicle. A maximum acceleration of the vehicle may be assumed until the velocity profile is reached. Doing so would again provide a discretized set of predictions of the vehicle velocity and position, both indexed to discrete time samples.

The IDM and/or PID tracking as explained above, operable in the vehicle cruise controller predictor 20, may be used to predict the ego vehicle behavior. For example, the predictions may be used to aid in vehicle control, as indicated at 40 in FIG. 1. In an example, the output predictions 30 are used by the vehicle control 40 to perform a power split analysis. For example, the predictions 30, in combination with route/path information, can be used to predict torque requests of the vehicle, which can then be used to optimize power split in a hybrid system to meet the predicted torque requests, while optimizing fuel consumption. The predictions 30 may include velocity and acceleration predictions to facilitate generating predicted torque requests. For example, with a prediction of torque requests of the vehicle within a prediction horizon, a controller may perform a cost function minimization to determine optimal use of stored battery power and fuel power, and then issue control signals to the hybrid powertrain(s) in accordance with the optimized utilization.

In another example, a transmission use optimization may be performed, wherein the predicted velocity data is used to identify which gear is optimal for use in the travel horizon and/or when to change gears to avoid transmission wear (such as by changing gears at a time before a large torque request is anticipated to occur), or with anticipatory downshifting if engine braking is predicted. Lead vehicle predictions may also be used within a speed advisory system, for example, to provide the driver with advance notice of upcoming, predicted, lead vehicle changes in velocity, for example. The generated predictions may be communicated off-vehicle to various remote, fleet, or cloud-based systems. For example, a traffic modeling system may obtain lead vehicle and ego vehicle models and prediction data, including the driver predictions, optionally from plural vehicles, to provide, for example, traffic density predictions. A traffic hazard identifier may, for example, obtain driver and lead vehicle prediction information, optionally from plural vehicles, and compare to actual vehicle performance/actions; where predictions and actions fail to correlate, the traffic hazard identifier may raise an alert to indicate further investigation needed at an identified location on a roadway in some examples. In another example, the lead vehicle and/or driver prediction models may be used to generate range estimation in an electric vehicle for use by a route planner or advisory system to identify optimal charging stops along the trip to, for example, minimize charging time (based for example on expected occupancy of charging stations along the route) and/or charging cost (based on current prices at individual charging stations).

Figure 3:
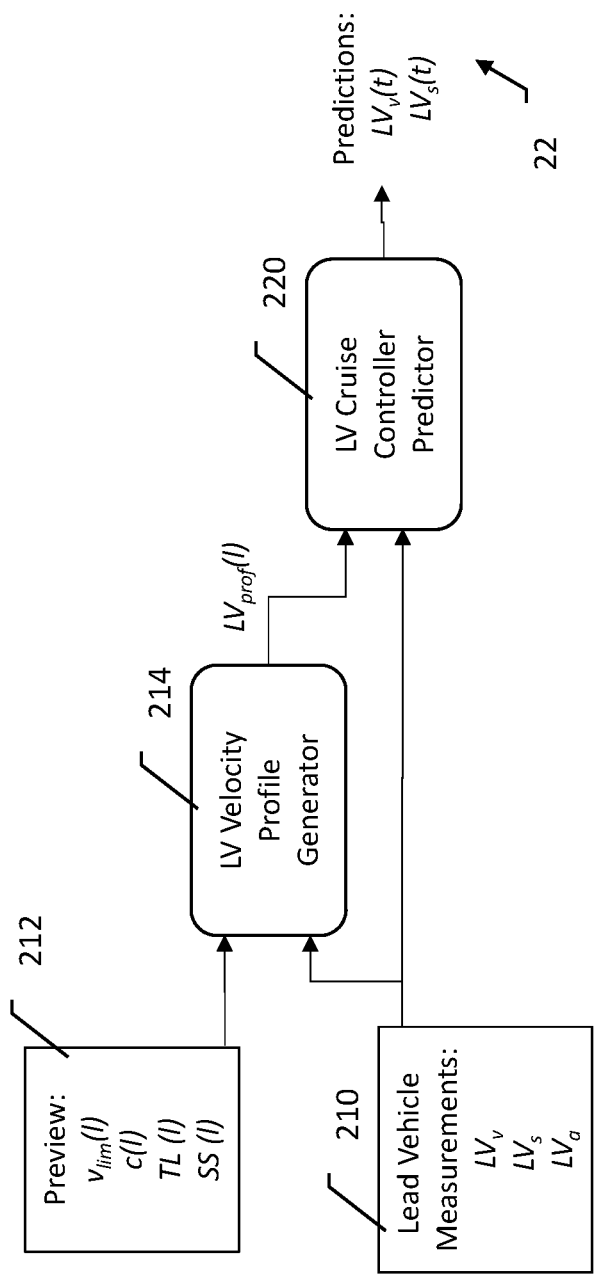
FIG. 3 shows a process flow for implementation of a lead vehicle predictor.

FIG. 3 illustrates how the lead vehicle predictions are generated. At a high level, the lead vehicle predictions are determined similar to the ego vehicle predictions, but without any consideration of a still further lead vehicle. Vehicle measurements are obtained at 210, using, for example, Lidar, Radar, or communications with the lead vehicle, and may include each of lead vehicle velocity ($LV_v$), lead vehicle position ($LV_s$), and lead vehicle acceleration ($LV_a$). A road preview is obtained at 212, including velocity limits $v_{lim}(l)$, where l is the distance variable along the expected route, and traffic control inputs which, in the example shown, include traffic lights preview, TL(l) and stop sign preview, SS(l). The preview also includes a road curvature preview c(l), indicating road curvature within the upcoming roadway. The preview at 212 in FIG. 3 differs from the preview in block 12 of FIG. 1 insofar as the distance variable l is adjusted to be determined relative to the lead vehicle position, rather than the ego vehicle position.

The lead vehicle measurements 210 and road preview 212 are provided to a velocity profile generator 214, which outputs a lead vehicle velocity profile, $LV_{prof}(l)$, as a function of the distance variable. A lead vehicle cruise controller predictor 220 receives the lead vehicle velocity profile from the lead vehicle velocity profile generator 214, and the lead vehicle measurements 210, and outputs predictions of lead vehicle velocity $LV_v(t)$ and lead vehicle distance $LV_s(t)$, each as functions of time. Lead vehicle acceleration, $LV_a(t)$, may also be calculated, as desired. That is, the predictions 22 indicate the lead vehicle position on the travel route and the velocity of the lead vehicle at each time instance. The predictions 22 are used as discussed above relative to FIG. 1.

The operations within block 214 will reuse much of the above discussion for block 14 of FIG. 1, but are adjusted as shown below to omit consideration of a further lead vehicle.

Block 214 is used to create a lead vehicle velocity profile which the LV Cruise predictor 220 can then track. The assumption is that the lead vehicle will follow a constant "virtual" velocity setpoint $v_{sp}$ unless an external disturbance or influence causes a change in velocity. The lead vehicle may change from time to time meaning that, unlike with the ego vehicle where $v_{sp}$ initialization would only occur once at the start of the travel route, re-initialization may be needed repeatedly. Initialization can simply use the first measured velocity of the lead vehicle, such that $v_{sp}(t_0)=v_{LV}(t_0)$, where $t_0$ is the time at which a new lead vehicle is detected.

The virtual velocity setpoint may change in response to changes in speed limit, road curvature, traffic signal, etc. This setpoint has to be estimated for the lead vehicle, since the lead driver's behavior is not yet known. The setpoint can be estimated as shown in Equation 17:

$$v_{sp}(t)=\lambda v_{sp}(t-1)+(1-\lambda)v_{update} \quad \{Eq.\ 17\}$$

Where λ is a filter constant, $v_{update}$ is the new value of the setpoint to be followed, and t is the discrete time variable. Filtering the update is done to reduce the impact of measurement noises and/or possibly erroneous $v_{update}$ values caused by such noises. The filter constant λ may be a design parameter set in the range of about 0.8 to about 0.99. In one example, λ is set to 0.95. This update to $v_{sp}$ may be evaluated against any design constraints before the actual velocity profile generation takes place.

Updating the lead vehicle virtual velocity setpoint can occur using $v_{update}$ as determined by one of the following:

Case 1: $v_{update}=LV_v(t)$, where $LV_v(t)$ is the lead vehicle velocity at time t, under the condition that the lead vehicle is not accelerating or decelerating.

Case 2: $v_{update}=v_{lim}(LV_s(t))$, where $v_{lim}(LV_s(t))$ is a velocity limit at the current lead vehicle distance/position $LV_s(t)$, under the conditions that $LV_v(t)>v_{sp}(t)$, and $LV_a(t)>0$, meaning that the lead vehicle is accelerating and has a higher velocity than the virtual velocity setpoint.

If neither of case 1 or case 2 applies, then $v_{update}=v_{sp}(t-1)$, and therefore $v_{sp}(t)=v_{sp}(t-1)$.

Regarding case 1, no lead vehicle acceleration or deceleration is occurring, and the value of the virtual setpoint update $v_{update}$ can then be set equal to the current lead vehicle velocity. Equation 17 is updated to Equation 18:

$$v_{sp}(t)=\lambda v_{sp}(t-1)+(1-\lambda)LV_v(t) \quad \{Eq.\ 18\}$$

The conditions for case 1 may be, but are not necessarily limited to, the following:

- $|LV_a(t)|<\epsilon_{AV}$ Here, the lead vehicle acceleration is nearly zero, and a threshold limit, $\epsilon_{AV}$ accounts for the measurement noise.
- $LV_v(t)>v_{updmin}$ Here, the lead vehicle velocity is higher than a threshold, $v_{updmin}$, which is design parameter. A threshold value for $v_{updmin}$ may be, for example, 3 m/s (10.8 km/hr), with a range for example of about 5 to about 15 km/hr, or more or less.

In combination with both of the above, either of:
- $LV_v(t)+\epsilon_{v_{lim}}<v_{lim}(LV_s(t))$, that is, the lead vehicle velocity is below velocity limits at least by an $\epsilon_{v_{lim}}$ threshold, where $LV_s(t)$ is the lead vehicle position along the route at time t. The threshold, $\epsilon_{v_{lim}}$ is design parameter with typical value of about 2 m/s, and may be in the range of about 1 to about 3 m/s, or more or less; or
- $LV_v(t)>v_{sp}(t)$; that is, the lead vehicle velocity is higher than the virtual setpoint $v_{sp}(t)$ value.

If all the conditions listed are satisfied simultaneously then $v_{update}=LV_v(t)$ and the virtual setpoint would be shifted towards the current lead vehicle velocity. At a higher level, this updating of the virtual velocity setpoint can be understood as occurring with the lead vehicle at more or less steady velocity, above some minimum velocity, and meeting one of two conditions: the lead vehicle is travelling below applicable velocity limits by at least some minimum amount, or the lead vehicle is travelling above the virtual velocity setpoint.

Turning next to case 2, the update will take place in response to the lead vehicle accelerating while the virtual velocity setpoint is below current lead vehicle speed. A higher setpoint is called for, as the virtual velocity setpoint is not reflecting the lead vehicle state. The analysis then calls for updating the virtual velocity setpoint toward its maximum value, which would be $v_{sp}(t)$, by updating Equation 17 as shown in Equation 19:

$$v_{sp}(t)=\lambda v_{sp}(t-1)+(1-\lambda)v_{lim}(LV_s(t)) \quad \{Eq.\ 19\}$$

The conditions needed for this update may be summarized as:

First, $LV_v(t)>v_{sp}(t)$, which means that the current lead vehicle velocity is above the current virtual velocity setpoint.

Second, $LV_a(t)>0$, meaning the lead vehicle is accelerating.

If desired, the second condition may be modified to use $LV_a(t)\geq 0$ or $LV_a(t)>\epsilon_{AV}$, as desired.

If the conditions for case 1 and case 2 are not met, then no update is needed and Equation 17 becomes simply:

$$v_{sp}(t)=v_{sp}(t-1) \quad \{Eq.\ 20\}$$

Turning next to the velocity limits preview, $v_{lim}(l)$, as indicated by the use of the distance index, l, this preview may be determined on a distance basis. Use of the distance index is natural as the preview will come from a map. The assumption is that the lead vehicle can drive at these limits except when external conditions do not allow the lead vehicle to do so, such as the presence of traffic, bad state of the road surface, weather conditions, and road curvature.

Road curvature can be used as a limitation, using c(l) as shown above in Equation 5. For purposes of lead vehicle calculations, an assumed value for maximum lateral acceleration may be used or, if it is possible to identify or classify the lead vehicle, then a value matching the identity or class of vehicle may be used. By "class of vehicle" it is meant that different vehicle types (truck, sedan, coupe, pickup truck, SUV) may be noted and the maximum lateral acceleration variable can be set according to each "class." For example, the maximum lateral acceleration for a coupe may be greater than that of an SUV or truck. The minimum of each of the velocity limitations will serve as the updated velocity limit, as shown in Equation 6, above, and the various factors for vlim1, vlim2, etc. as discussed above again apply, including stop signs. Traffic signal influences may also be applied to the lead vehicle calculations. Posted speed limits may be omitted from the analysis of the lead vehicle, but prevailing traffic speeds, if known, may be included if desired. One modification when determining $v_{updlim}$ for the lead vehicle is that a further lead vehicle is not considered in some examples. The shifting procedure discussed with respect to Equations 7 and 8 above again applies.

The lead vehicle velocity profile can then be determined as follows shown in Equation 21:

$$LV_{prof}(l)=\min(v_{sp},v_{lim,proc}(l)) \quad \{Eq.\ 21\}$$

Where the system will generate a vector through the upcoming travel horizon comprising a plurality of discrete $LV_{prof}$ ($l_i$) data points. The illustration of FIG. 2, above, would again apply, except, as noted, that a further lead vehicle in front of the lead vehicle itself may not be considered.

The lead vehicle velocity profile is provided to the lead vehicle cruise controller predictor as shown at 220. As before, the IDM or a PID tracking reference may be used to calculate lead vehicle velocities, accelerations, and positions, with the transition to the time domain and discretization as described above relative to the ego vehicle cruise controller predictor 20 of FIG. 1 being used again. In some examples, rather than an IDM or PID tracking reference, the lead vehicle cruise predictor 220 instead uses a Precise Predictions Variant (PPV). In the PPV, the IDM model is modified as shown in Equation 22:

$$LV_a = a_{max}\left(1-\left(\frac{v_d(t_c)}{v_0(t_c)}\right)^4\right) \quad \{Eq.\ 22\}$$

When the calculations are performed with the ego vehicle, if no lead vehicle is detected, rather than swapping in or out new equations, a lead vehicle distance may be set so far away (such as several kilometers) that ego vehicle calculations will not be affected.

Some examples may further modify the lead vehicle predictions for a "safe" predictions variant by, for example, including a more conservative estimation in the prediction wherein the lead vehicle distance is capped at the actual lead vehicle distance, preventing the prediction from relying on a greater lead vehicle distance when making predictions.

Figure 4:
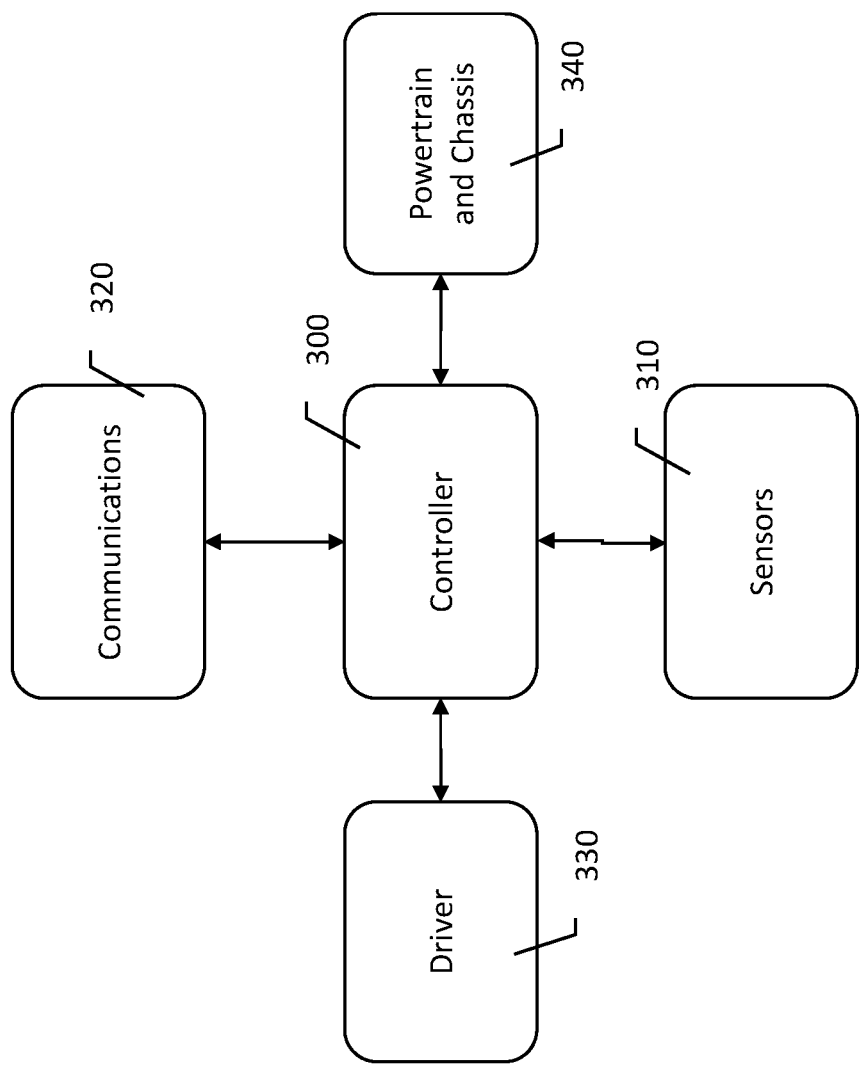
FIG. 4 is a functional block diagram of a vehicle.

FIG. 4 shows an illustrative vehicle. The illustrative system includes a controller 300 which interfaces with several illustrative vehicle subsystems. Sensors 310 may be used to sense various vehicle characteristics, including for example, speed, sway, acceleration, surroundings (such as via camera, LIDAR, and/or radar systems), ambient conditions including temperature, etc. A communications system is included as indicated at 320, and may include wireless connection circuits and devices (BLUETOOTH®, WI-FI® cellular 4G or 5G, etc.). The communications system 320 may be used to obtain data from infrastructure, surrounding vehicles, navigation resources, etc. The system is configured to interact with a driver 330, who provides steering, acceleration, and brake inputs, in some examples; autonomous and/or semi-autonomous driving modes may be enabled if desired. A powertrain and chassis subsystem is shown at 340 and may include, for example and without limitation, additional subsystems for monitoring and controlling actions related to fuel, airflow, engine, and/or transmission. The subsystem 340 may incorporate an internal combustion engine (diesel, gasoline or other fuel), an electric motor, a hybrid combustion/electric system, or any other power generation system. The subsystem 340 may include chassis related subsystems as well, including stability control, tire monitoring, steering, brake controls, etc. In some examples, each subsystem 300, 310, 320, 340 may have its own controller(s), such as by provision of an electronic control unit (ECU) in the form of a microcontroller, microprocessor, or state machine, along with associated memory for storing data and machine-readable instruction sets in, for example, any suitable non-transitory media, and other circuitry as needed, such as logic or signal processing circuits, for example. An ECU may be referred to as an engine control unit for some subsystems.

Interactions among these various blocks 300, 310, 320, 330, 340 may take place via wired or wireless connections, using one or more busses for example, and may include a range of different signal types. One solution in vehicles is the use of the Controller Area Network (CAN) Bus architecture. In an example, each CAN Bus node includes a central processor, a CAN controller, and a CAN transceiver as defined by ISO 11898 and its various subparts.

The vehicle controller 300 may include a microprocessor or microcontroller, or other control circuitry (such as a state machine), various logic circuitry, and a memory for storing operational instruction sets as well as for storing various data, as further detailed below. The vehicle controller 300 may include memory that stores executable instructions for performing methods as described above relative to FIGS. 1-3 and below relative to FIG. 5.

Figure 5:
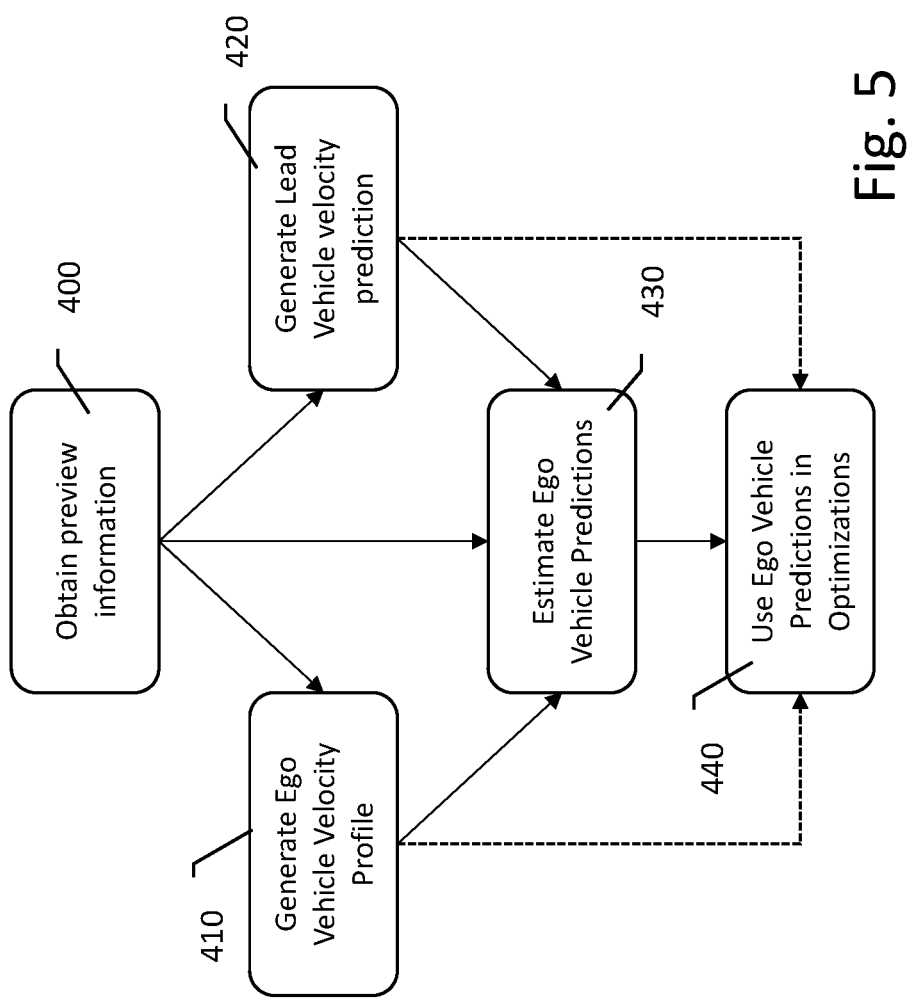
FIG. 5 is a block diagram of a method of operation in a vehicle.

FIG. 5 is a block flow diagram for an overall process of vehicle operation. The method may be performed in the context of a vehicle as in FIG. 4. Starting at block 400, preview information is obtained, such as by reference to a current vehicle location which may be obtained from a navigation system. Map data related to the route on which the vehicle is travelling is obtained, from navigation or from data, as desired. The preview information is used to generate an ego vehicle velocity profile at 410. The ego vehicle velocity profile, as described above, uses route data to determine velocities at which the vehicle can drive by, for example, creating a virtual velocity setpoint that can be adjusted up and down in response to drive actions (accelerations, decelerations) and/or choices. The ego vehicle velocity profile calculation at 410 may further include selecting between applicable vehicle velocity limits, such as safety/comfort limits determined at least in part from route information, and the virtual velocity setpoint to determine the ego vehicle velocity profile as a function of location/distance along the route.

A lead vehicle velocity prediction is also generated at 420. The lead vehicle velocity prediction may rely on a lead vehicle velocity profile which can be generated using similar methods to those used in block 410. Further traffic control information, including stop signal and traffic light information, can be integrated into the ego vehicle velocity profile calculation at 410, 420 as desired.

Predictions are then generated for the ego vehicle at 430. The predictions at 430 may include, for example, ego vehicle velocity, position and acceleration predictions at upcoming points in time. Notably, the input from 410 to the predictions at 430 may reference location on the route, while the prediction outputs are functions of time in an illustrative example. The ego vehicle predictions at 430 are limited by the lead vehicle predictions obtained from 420.

The ego vehicle predictions can be used in ego vehicle optimization routines at 440. Optimization routines at 440 may also account for the ego vehicle velocity profile 410 and/or lead vehicle velocity prediction 420, as desired. As described above, such optimizations may include gear selection and/or hybrid powertrain power split determinations.

Each of these non-limiting examples can stand on its own, or can be combined in various permutations or combinations with one or more of the other examples. The above detailed description includes references to the accompanying drawings, which form a part of the detailed description. The drawings show, by way of illustration, specific embodiments, which may also be referred to as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. An ego vehicle comprising:
a powertrain and a navigation system, and a controller comprising processor circuitry coupled to each of the powertrain and the navigation system, the controller configured to:
obtain preview information from the navigation system including velocity limit data related to a route on which the vehicle is travelling, and lead vehicle data related to a lead vehicle that is also on the route;
generate, for the lead vehicle, a lead vehicle velocity prediction, wherein the controller is configured to generate the lead vehicle velocity prediction by:
initializing a lead vehicle velocity setpoint using a measured velocity of the lead vehicle,
calculating lead vehicle velocity limits using the preview information, and
determining the lead vehicle velocity prediction using the lead vehicle velocity setpoint and lead vehicle velocity limits by predicting that
the lead vehicle will accelerate to the lead vehicle velocity limits;
generate, for the ego vehicle, an ego vehicle velocity profile; and estimate an ego vehicle velocity prediction, wherein the controller is configured to adjust the lead vehicle velocity setpoint up and down as follows:
if the lead vehicle is not accelerating:
if the lead vehicle is travelling above the lead vehicle velocity setpoint, the lead vehicle velocity setpoint is adjusted upward;
if the lead vehicle is travelling above a minimum velocity and is travelling below the lead vehicle velocity limits less a margin, the lead vehicle velocity setpoint is adjusted downward; and
if the lead vehicle is accelerating, and the lead vehicle is travelling above the lead vehicle velocity setpoint, the lead vehicle velocity setpoint is adjusted upward.

2. The ego vehicle of claim 1 wherein the controller is configured to:
generate a lead vehicle velocity profile as a function of lead vehicle position on the route, and
convert the lead vehicle velocity profile into the lead vehicle velocity prediction as a function of time.

3. The ego vehicle of claim 2, wherein the controller is configured to generate the lead vehicle velocity prediction without attempting to account for a further lead vehicle in front of the lead vehicle.

4. The ego vehicle of claim 2, wherein the controller is configured to use the lead vehicle velocity prediction to limit the ego vehicle velocity prediction if the ego vehicle would, within the prediction window, come within a distance threshold of the lead vehicle.

5. The ego vehicle of claim 1, wherein the controller is configured to generate the ego vehicle velocity profile by:
either initializing an ego velocity setpoint, or adjusting a stored ego vehicle velocity setpoint up and down in response to actions of a driver;
calculating ego vehicle velocity limits as a function of location on the route using the preview information without considering the lead vehicle; and
using a minimum of the ego vehicle velocity setpoint or the ego vehicle velocity limits as the ego vehicle velocity profile for locations along the route.

6. The ego vehicle of claim 5, wherein the ego vehicle velocity limits include at least one of:
a velocity limit calculated using road curvature; and
a velocity limit based on prevailing traffic speeds.

7. The ego vehicle of claim 5, wherein the controller is configured to adjust the ego vehicle velocity setpoint up and down as follows:
if the ego vehicle is not accelerating:
if the ego vehicle is travelling above the ego vehicle velocity setpoint, the ego vehicle velocity setpoint is adjusted upward;
if the ego vehicle is travelling above a minimum velocity and is travelling below the ego vehicle velocity limits less a margin, without a lead vehicle present, the ego vehicle velocity setpoint is adjusted downward; and
if the ego vehicle is accelerating, and the ego vehicle is travelling above the ego vehicle velocity setpoint, the ego vehicle velocity setpoint is adjusted upward.

8. The ego vehicle of claim 1, wherein the powertrain is a hybrid powertrain including a first power source and a second power source, wherein the controller is configured to use the ego vehicle velocity prediction to calculate a torque split for the hybrid powertrain.

9. The ego vehicle of claim 1, wherein the controller is configured to estimate, for the ego vehicle, an acceleration prediction and a position prediction, each as a function of time, along with the ego vehicle velocity prediction.

10. The ego vehicle of claim 1, wherein the controller comprises:
a velocity profile generator configured to generate the ego vehicle velocity profile;
a lead vehicle prediction module configured to generate the lead vehicle velocity prediction; and
a vehicle cruise controller configured to receive the ego vehicle velocity profile and the lead vehicle velocity prediction, and estimate the ego vehicle velocity prediction.

11. The ego vehicle of claim 1, wherein the controller is further configured to control one or more operations of the powertrain and/or of the navigation system while the ego vehicle is traveling on the route and based at least in part on the ego vehicle velocity prediction.

12. A method of operation in an ego vehicle having a powertrain, a navigation system, and a controller comprising processor circuitry, the method comprising:
the controller obtaining preview information from the navigation system including velocity limit data related to a route on which the vehicle is travelling, and lead vehicle data related to a lead vehicle that is also on the route;
the controller generating, for the lead vehicle, a lead vehicle velocity prediction, wherein generating the lead vehicle velocity prediction is performed by:
initializing a lead vehicle velocity setpoint using a measured velocity of the lead vehicle;

calculating lead vehicle velocity limits using the preview information, determining the lead vehicle velocity prediction using the lead vehicle velocity setpoint and lead vehicle velocity limits by predicting that the lead vehicle will accelerate to the lead vehicle velocity limits; and adjusting the lead vehicle velocity setpoint up and down as follows:

determining that the lead vehicle is accelerating or is not accelerating;

adjusting the lead vehicle velocity setpoint upward based on determining that the lead vehicle is not accelerating and is traveling above the lead vehicle velocity setpoint;

adjusting the lead vehicle velocity setpoint downward based on determining that the lead vehicle is not accelerating and is traveling above a minimum velocity and is traveling below the lead vehicle velocity limits less a margin; and adjusting the lead vehicle velocity setpoint based on determining that the lead vehicle is accelerating and the lead vehicle is traveling above the lead vehicle velocity setpoint, the controller generating, for the ego vehicle, an ego vehicle velocity profile;

the controller estimating an ego vehicle velocity prediction using the lead vehicle velocity prediction and the ego vehicle velocity profile; and the controller controlling one or more operations of the powertrain and/or of the navigation system while the ego vehicle is traveling on the route and based at least in part on the ego vehicle velocity prediction.

13. The method of claim 12, wherein the step of generating the lead vehicle velocity prediction comprises:

generating a lead vehicle velocity profile as a function of lead vehicle position on the route, and converting the lead vehicle velocity profile into the lead vehicle velocity prediction as a function of time, without attempting to account for a further lead vehicle in front of the lead vehicle.

14. The method of claim 12 wherein the step of estimating the ego vehicle velocity prediction includes:

monitoring a distance between the ego vehicle and the lead vehicle;

determining that the ego vehicle will come within a distance threshold of the lead vehicle within a prediction window; and using the lead vehicle velocity prediction to limit the ego vehicle velocity prediction based on determining that the ego vehicle will come within a distance threshold of the lead vehicle within the prediction window.

15. The method of claim 12 wherein the preview information comprises at least one of traffic light or stop sign data, and the step of estimating the ego vehicle velocity prediction includes using the at least one of traffic light or stop sign data to limit the ego vehicle velocity prediction.

16. The method of claim 12 wherein the step of generating the ego vehicle velocity profile includes:

either initializing an ego velocity setpoint, or adjusting a stored ego vehicle velocity setpoint up and down in response to actions of a driver;

calculating ego vehicle velocity limits as a function of location on the route using the preview information without considering the lead vehicle; and using a minimum of the ego vehicle velocity setpoint or the ego vehicle velocity limits as the ego vehicle velocity profile for locations along the route.

17. The method of claim 16, further comprising adjusting the ego vehicle velocity setpoint up and down as follows:

determining that the ego vehicle is accelerating or is not accelerating;

adjusting the ego vehicle velocity setpoint upward based on determining that the ego vehicle is not accelerating and is traveling above the ego vehicle velocity setpoint;

adjusting the ego vehicle velocity setpoint downward based on determining that the ego vehicle is not accelerating and is traveling above a minimum velocity and is traveling below the ego vehicle velocity limits less a margin; and adjusting the ego vehicle velocity setpoint based on determining that the ego vehicle is accelerating and the ego vehicle is traveling above the ego vehicle velocity setpoint.

* * * * *